United States Patent
Su et al.

(10) Patent No.: US 10,641,379 B2
(45) Date of Patent: May 5, 2020

(54) ELECTRONIC PARKING LOCK ACTUATOR FOR AUTOMATIC TRANSMISSION OF VEHICLE

(71) Applicant: Johnson Electric International AG, Murten (CH)

(72) Inventors: Hang Su, Hong Kong (HK); Linan Li, Hong Kong (HK); Yong Shuai, Hong Kong (HK); Jinan Nie, Hong Kong (HK); Yajie Chen, Hong Kong (HK)

(73) Assignee: Johnson Electric International AG, Murten (CH)

( * ) Notice: Subject to any disclaimer, the term of this patent is extended or adjusted under 35 U.S.C. 154(b) by 0 days.

(21) Appl. No.: 16/178,637

(22) Filed: Nov. 2, 2018

(65) Prior Publication Data

US 2019/0136960 A1    May 9, 2019

(30) Foreign Application Priority Data

Nov. 2, 2017  (CN) .......................... 2017 1 1064712

(51) Int. Cl.
| | |
|---|---|
| *F16H 57/021* | (2012.01) |
| *F16H 63/34* | (2006.01) |
| *F16H 57/029* | (2012.01) |
| *F16H 57/039* | (2012.01) |
| *F16H 57/02* | (2012.01) |
| *F16H 57/031* | (2012.01) |

(52) U.S. Cl.
CPC ......... *F16H 57/021* (2013.01); *F16H 57/029* (2013.01); *F16H 57/039* (2013.01); *F16H 63/3466* (2013.01); *F16H 57/031* (2013.01); *F16H 2057/02034* (2013.01); *F16H 2057/02082* (2013.01)

(58) Field of Classification Search
CPC ... F16H 57/029; F16H 57/031; F16H 63/3466
See application file for complete search history.

(56) References Cited

U.S. PATENT DOCUMENTS

| | | | | |
|---|---|---|---|---|
| 5,213,173 | A | * | 5/1993 | Konishi ............... B62D 5/0409 180/444 |
| 2013/0104682 | A1 | * | 5/2013 | Schneider ................. F16H 1/20 74/421 A |
| 2014/0000400 | A1 | * | 1/2014 | Klimes ..................... F16H 1/20 74/421 A |

FOREIGN PATENT DOCUMENTS

CN          206186745 U      5/2017

* cited by examiner

*Primary Examiner* — Vicky A Johnson

(57) ABSTRACT

An electronic parking lock actuator includes a driving motor and a gearbox coupled to the driving motor. The gearbox includes a casing which comprises a base and a cover mounted on the base, a gear housed in the casing and engaged with the driving motor for outputting a driving force generated by the driving motor, and a controller fixed in the casing. The base includes a bottom plate, and a plurality of peripheral walls extending upward from edges of the bottom plate. The bottom plate defines at one or more cavities. The controller includes a printed circuit board and a plurality of electronic components disposed on a side of the printed circuit board facing the bottom plate. The electronic components are accommodated in the cavities.

8 Claims, 4 Drawing Sheets

ELECTRONIC PARKING LOCK ACTUATOR FOR AUTOMATIC TRANSMISSION OF VEHICLE

CROSS REFERENCE TO RELATED APPLICATIONS

This non-provisional patent application claims priority under 35 U.S.C. § 119(a) from Patent Application No. 201711064712.X filed in The People's Republic of China on Nov. 2, 2017.

FIELD OF THE INVENTION

The present disclosure relates to an actuator, and more particularly to an electronic parking lock actuator for automatic transmission of vehicle.

BACKGROUND OF THE INVENTION

With the widespread use of electronic controls in vehicle, more and more automatic transmission vehicles use an electronic parking lock actuator instead of a conventional shift lever to lock the transmission in parking. An existing electronic parking lock actuator typically includes a motor and a corresponding speed reduction mechanism, such as a worm/gear, gear train, etc., and the controller of the motor is typically designed separately and then coupled to the motor via a cable. This design is not compact enough and takes up a lot of space.

SUMMARY OF THE INVENTION

One aspect of the present invention provides an electronic parking lock actuator including a driving motor and a gearbox coupled to the driving motor. The gearbox includes a casing which includes a base and a cover mounted on the base, a gear housed in the casing and engaged with the driving motor for outputting a driving force generated by the driving motor, and a controller fixed in the casing. The base includes a bottom plate, and a plurality of peripheral walls extending upward along an edge of the bottom plate. The bottom plate defines at one or more cavities. The controller includes a printed circuit board and a plurality of electronic components disposed on a side of the printed circuit board facing the bottom plate. The electronic components are accommodated in the cavities.

Preferably, the bottom plate of the casing further defines a receiving space receiving the gear, the receiving space is not in communication with the at least one cavity.

Preferably, the receiving space includes a first accommodating area and a second accommodating area coaxially stacked along a direction perpendicular to the bottom plate, the second accommodating area is located below the first accommodating area and has a diameter smaller than a diameter of the first accommodating area, and an opening is defined in a bottom of the second accommodating area, and the opening is aligned with a center of the second accommodating area, the gear includes a disc-like gear body and a gear shaft disposed on one side of the gear body, the gear body is rotatably received in the first accommodating area, and the gear shaft of the gear is rotatably received in the second accommodating area.

Preferably, the electronic parking lock actuator further includes a magnetic ring disposed on a side of the gear body away from the gear shaft and aligned with a central axis of the gear body.

Preferably, the receiving space and the cavity are defined by recessing from an upper surface of the bottom plate, and an upper surface of the bottom plate is perpendicular to the gear shaft.

Preferably, the electronic parking lock actuator further includes a gear lid fixed in the casing, to seal the gear shaft.

Preferably, a plurality of fixing holes is defined in the gear lid, and a plurality of first positioning posts is disposed on the bottom plate correspondingly fixed in the plurality of fixing holes to fix the gear lid to the bottom plate.

Preferably, the first positioning posts are evenly distributed along the circumferential direction around the receiving space.

Preferably, a plurality of fixing holes is defined in the printed circuit board, and a plurality of second positioning posts is disposed on the bottom plate correspondingly fixed in the plurality of fixing holes to fix the controller to the bottom plate.

Preferably, the at least one cavity one includes more than one cavities not in communicated with each other.

Below, embodiments of the present disclosure will be described in detail with reference to the accompanying drawings.

DETAILED DESCRIPTION OF THE PREFERRED EMBODIMENTS

Figure 1:
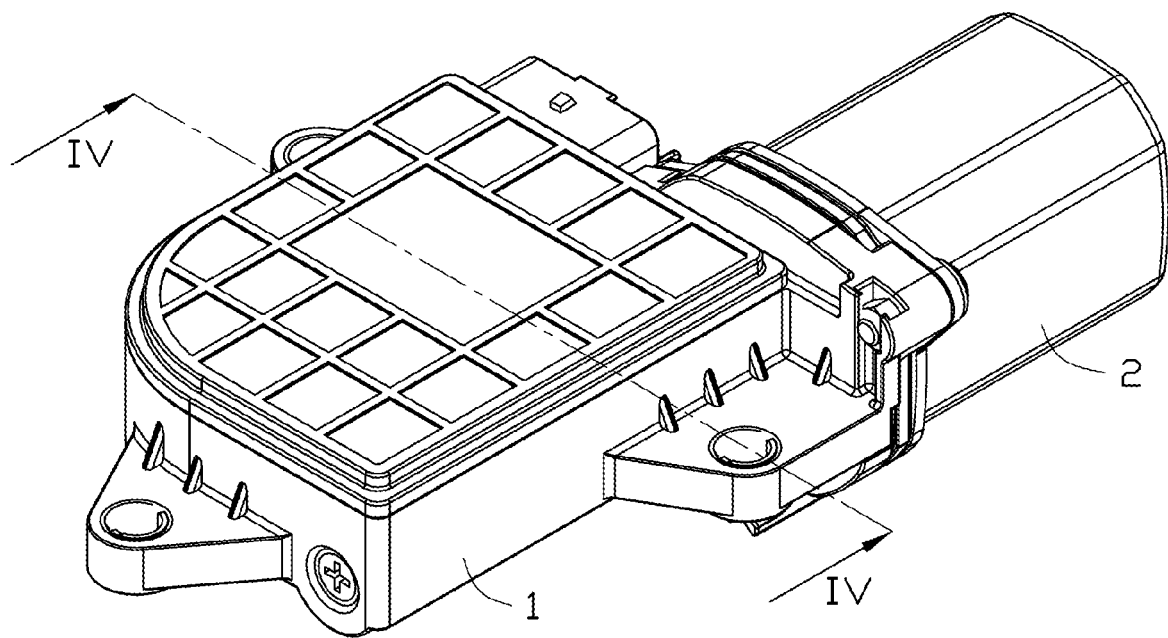
FIG. 1 is a perspective view of an electronic parking lock actuator according to an embodiment of the present disclosure.
Figure 2:
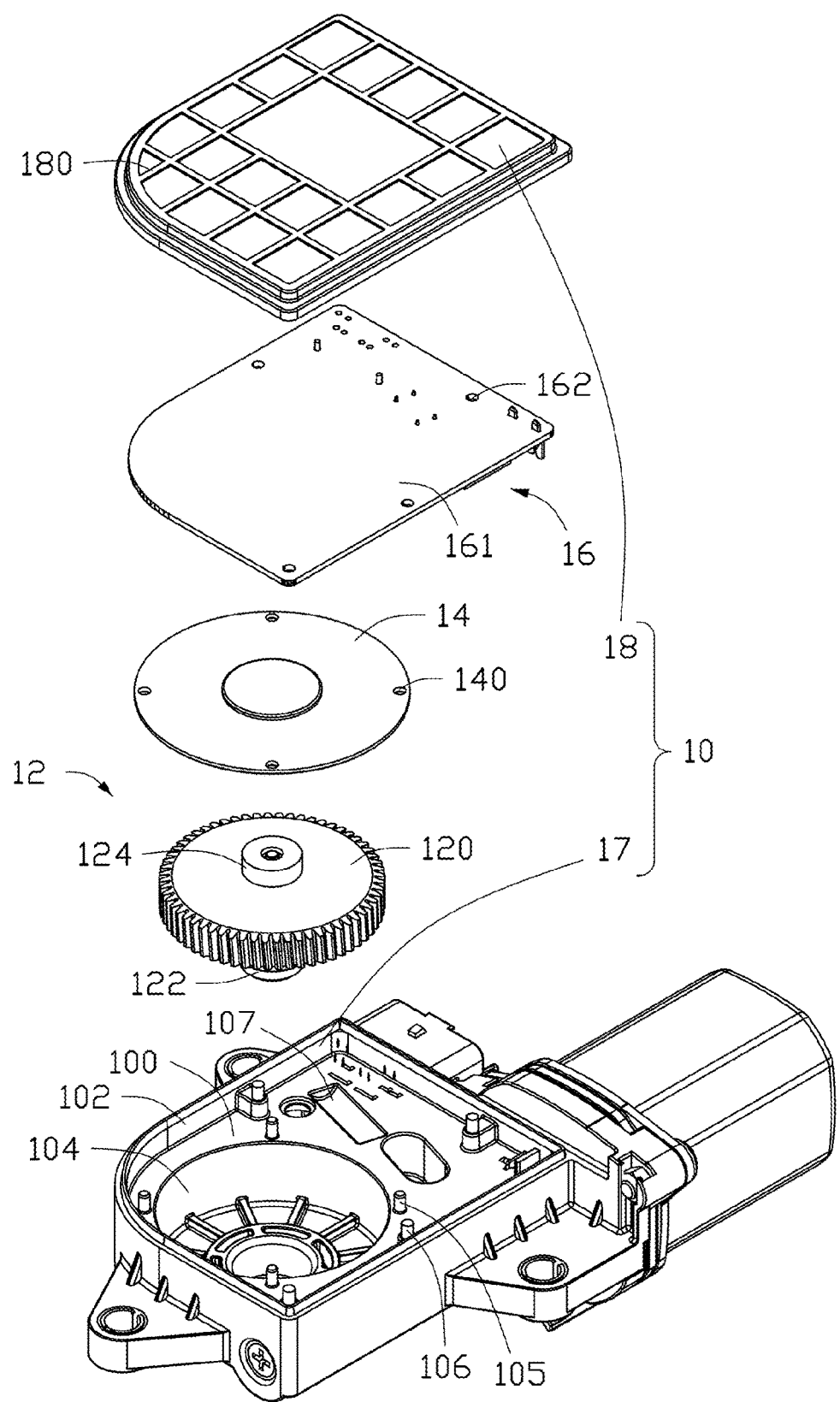
FIGS. 2 and 3 are exploded perspective views of the electronic parking lock actuator shown in FIG. 1 from different perspectives.
Figure 3:
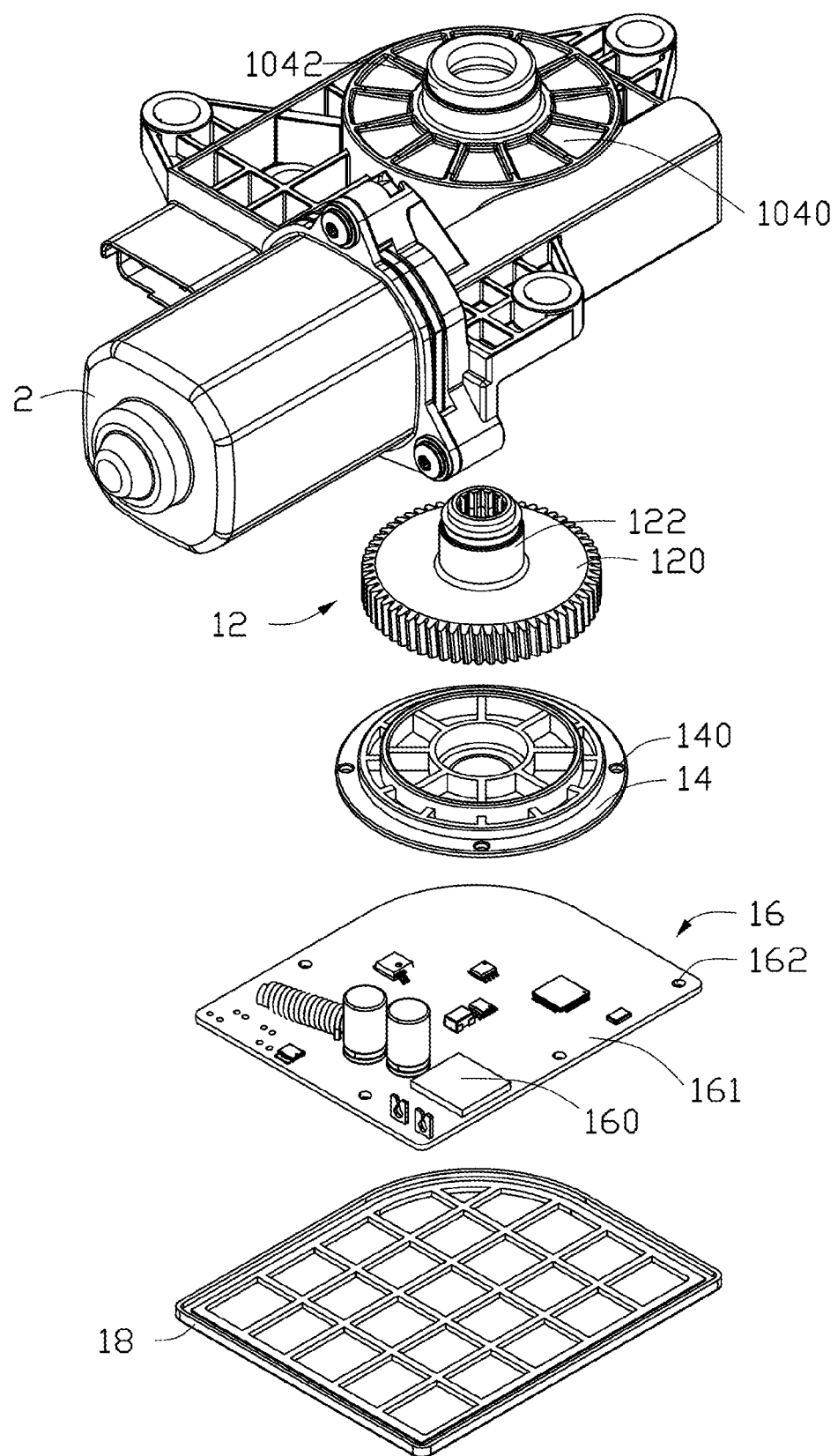

Referring to FIG. 1, FIG. 2 and FIG. 3, an electronic parking lock actuator according to an embodiment of the present disclosure is provided. The electronic parking lock actuator includes a gearbox 1 and a driving motor 2 fixedly connected to a side of the gearbox. The gearbox 1 includes a casing 10, a gear 12 housed in the casing, a gear lid 14, and a controller 16. The casing 10 includes a base 17 and a cover 18 mounted on the base 17. The casing 10 may be made of a material such as plastic or resin. The base 17 includes a bottom plate 100 and a plurality of peripheral wall 102 extending upward along an edge of the bottom plate 100. The bottom plate 100 and the peripheral walls 102 enclose a room for accommodating the gear 12, the gear lid 14, and the controller 16. The cover 18 can be covered on the top of the peripheral wall 102 to close the room. The upper surface of the bottom plate 100 is further recessed downward to form a receiving space 104 and one or more cavities 107. The receiving space 104 is not in communication with the cavities 107. The receiving space 104 is round for accommodating the gear 12. The bottom plate 100 further defines an opening 1042 in communicated with the receiving space 104 to expose the gear 12 from the bottom of the casing 10 when the gear 12 is received in the receiving space 104. In addition, the gear 12 can be engaged with a locking mechanism of an automatic transmission, for example a lock actuating rod, via the opening 1042. So that, the lock mechanism can be driven to be locked or unlocked through the electronic parking lock actuator.

The receiving space 104 includes a first accommodating area 1040 and a second accommodating area 1041, which are two round and of a coaxially stacked along a direction perpendicular to the bottom plate 100. The second accommodating area 1041 is located below the first accommodating area 1040 and has a smaller diameter than the first accommodating area 1040.

The gear 12 is rotatably received in the receiving space 104 and connected to the driving motor 2 for outputting the driving force generated by the driving motor 2. The gear 12 can be made of a metal material. It can be understood that in other embodiments, the gear 12 can also be made of a material such as a resin. The gear 12 includes a disc-like gear body 120 and a gear shaft 122 disposed on one side of the gear body 120. The gear shaft 122 protrudes from a center of rotation of the gear body 120 and coaxially with the gear body 120. A magnetic ring 124 is disposed on a side of the gear body 120 away from the gear shaft 122 and align with a central axis of the gear body 120. The magnetic ring 124 is configured to detect a rotation angle of the gear 12. The gear body 120 is rotatably received in the first accommodating area 1040, and the gear shaft 122 is rotatably received in the second accommodating area 1041. The upper surface of the bottom plate 100 of the casing 10 is perpendicular to the gear shaft 122.

The shape of the gear lid 14 is adapted to the shape of the receiving space 104 and is substantially circular. The gear lid 14 may be made of a material such as metal or resin. Preferably, the outer diameter of the gear lid 14 is slightly larger than the inner diameter of the receiving space 104, so that the gear lid 14 can completely cover the receiving space 104. A plurality of fixing holes 140 is defined in the gear lid 14 near its circumferential edge. A plurality of first positioning posts 105 is disposed on the bottom plate 100 corresponding to the gear lid fixing hole 140. The first positioning posts 105 are evenly distributed along the circumferential direction around the receiving space 104. In assembly, the first positioning posts 105 correspondingly pass through the fixing hole 140 to position the gear lid 14 to the bottom plate 100. The first positioning post 105 is then deformed by means of hot melt, extrusion, etc., thereby securing the gear lid 14 to the bottom plate 100.

It can be understood that the gear lid 14 can also be fixed to the casing 10 by other suitable fixing means to ensure the gear lid 14 to seal the receiving space 104. For example, in one embodiment, the gear lid 14 may be provided with a fixing protrusion, and the bottom plate 100 may be provided with a fixing hole, and the gear lid 14 is fixed to the casing 10 by the fixing engagement of the fixing protrusion and the fixing groove. Alternatively, the gear lid 14 can be fixedly engaged in the receiving space 104 by an interference fit, that is, the outer circumference of the gear lid 14 tightly abuts against the peripheral wall of the receiving space 104. Still alternatively, the gear lid 14 and the bottom plate 100 are both provided with fixing holes. The fixing holes of the gear lid 14 and the bottom plate 100 are correspondingly aligned to enable a plurality of fasteners, each of them sequentially passing through one of the fixing holes of the gear lid 14 and the fixing holes of the bottom plate 100, to secure the gear lid 14 to the bottom plate 100. Still alternatively, one of the gear lid 14 and the bottom plate 100 is provided with a buckle, and the other of the two is provided with a slot, and the gear lid 14 is secured to the bottom plate 100 by the cooperation of the buckle and the slot.

The controller 16 is a Printed Circuit Board Assembly (PCBA), which includes a printed circuit board 161 having a substantially rectangular shape corresponding to the shape of the bottom plate 100, and a plurality of electronic components 160 mounted on the printed circuit board 161. The components 160 include, but is not limited to, capacitors, resistors, inductors, a CPU, and the like. All of the electronic components 160 are mounted to the side of the printed circuit board 161 facing the bottom plate 100. The controller 16 is fixed in the casing 10. In one embodiment, the printed circuit board 161 is provided with a plurality of fixing holes 162. A plurality of second positioning posts 106 is disposed on the bottom plate 100 corresponding to the fixing holes 162. In assembly, the second positioning posts 106 correspondingly pass through the fixing holes 162 to be positioned to the controller 16 to the bottom plate 100. The second positioning posts 106 are then deformed by means of hot melt, extrusion, etc., thereby securing the controller 16 to the base plate 100 and locating the side of the gear lid 14 facing away from the gear 12. In other words, the gear 12 is isolated from the controller 16 by the gear lid 14, thereby avoiding the possibility of abrasive grains and spilled lubricating oil generated during gear operation contacting the controller 16, preventing the controller 16 from failing.

In the present embodiment, the cavities 107 in the casing 10 are disposed corresponding to the electronic components 160 of the controller 16, and in particular, corresponding to relatively large electronic components such as coils, capacitors, etc., thereby when the controller 16 is fixed to the bottom plate 100, the electronic components 160 are just accommodated in the cavities 107. The cavities 107 are adapted to the shape of the electronic components 160. By accommodating the electronic components 160 in the corresponding cavities 107, the controller 16 can be mounted in the casing 10 compactly. In one embodiments, the cavities 107 may or may not communicate with each other.

Similar to the manner in which the gear lid 14 and the casing 10 are engaged, the manner in which the controller 16 is coupled to the casing 10 is not limited to the embodiment shown in the drawings, and may be any suitable coupling manner. For example, in one embodiment, a fixing protrusion may be provided on the controller 16, and a fixing hole may be defined the bottom plate 100, and the controller 16 is fixed to the casing 10 by the engagement of the fixing protrusion and the fixing hole. Alternatively, the controller 16 and the bottom plate 100 are both provided with fixing holes. The fixing holes of the controller 16 and the bottom plate 100 are correspondingly aligned to enable a plurality of fasteners enable a plurality of fasteners, each of them sequentially passing through one of the fixing holes of the controller 16 and the fixing holes of the bottom plate 100, to secure the controller 16 to the bottom plate 100. Still alternatively, one of the controller 16 and the bottom plate 100 is provided with a buckle, and the other of the two is provided with a slot, and the controller 16 is secured to the bottom plate 100 by the cooperation of the buckle and the slot.

The electronic components 160 of the controller 16 are all distributed on the same side of the printed circuit board 161 facing the bottom plate 100, thereby simplifying the manufacturing of the controller 16. The electronic components 160 of the controller 16 are received in the cavities 107 such that the electronic components 160 and the gear 12 overlap at least a portion in an axial direction of the gear 12 such that the gearbox 1 is more compact in the axial direction and can provide better shock resistance to the controller 16.

In the embodiment shown in the figure, the shape of the controller 16 is substantially the same as the shape of the bottom plate 100, but it can be understood that in other embodiments, the shape and size of the controller 16 may be appropriately adjusted according to the number and size of the electronic components 160. In other words, the shape and size of the controller 16 can be variable as long as the controller 16 can be housed and fixed in the casing 10.

The shape of the cover 18 is adapted to the opening of the room defined by the base 17. Therefore, when the cover 18 is fixed to the base 17, the cover 18 covers close the opening of the room, thereby the controller 16, the gear lid 14, and the gear 12 are enclosed within the room. The cover 18 can be secured to the base 17 by any suitable means, such as snap fit, interference fit, screwing, and the like.

Figure 4:
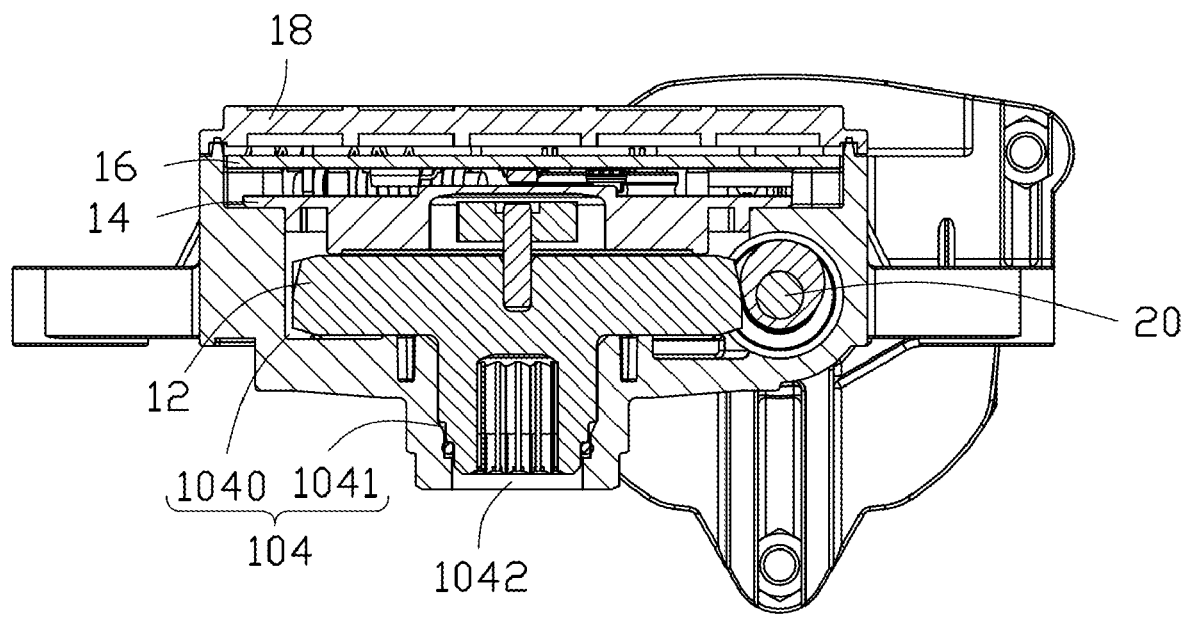
FIG. 4 is a cross-sectional view of the electronic parking lock actuator of FIG. 1 taken along line IV-IV.

Referring to FIG. 4, when the electronic parking lock actuator is assembled, the gear lid 14 abuts the upper surface of the gear 12 to provide an axial support for the gear 12 and control the axial movement of the gear 12. Therefore it is advantageous for improving the positional stability of the magnetic ring 124 when the gear shaft 122 of the gear 12 is in work, and improving the angle detection accuracy. In addition, Since some grease is always applied, and metal abrasive grains may also be produced after a period of operation, the gear lid 14 can provide a certain sealing function and eliminate the possibility that the grease and the abrasive particles contact the controller 16, so that the electronic components 160 on the controller 16 can be prevented from failing.

Since no electronic component is provided on the printed circuit board 161 facing the cover 18, the cover 18 can abut against the printed circuit board 161. In some embodiments, a plurality of protruding ribs 180 may be disposed on a side of the cover 18 facing the controller 16, and the plurality of protruding ribs 180 are spaced apart to form a mesh shape. Between adjacent protruding ribs 180, grooves are formed to provide space for pins and the like on the controller 16. Furthermore, the mesh structure can further improve the shock resistance and stability of the gearbox 1.

A worm is mounted to a driving shaft 20 of the driving motor 2. The worm is engaged with the gear 12. The controller 16 is configured to receive a signal, i.e., the electronic shifter being switched to "P", and issue a control command to start the driving motor 2. Then, the worm is rotated with the driving shaft of the driving motor 2, and thereby the gear 12 being driven to rotate together with the worm. The gear shaft 122 rotates synchronously with the gear 12 to actuate the locking mechanism connected to the gear shaft 122 to lock the automatic transition of the vehicle.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

What is claimed is:

1. An electronic parking lock actuator, comprising a driving motor and a gearbox coupled to the driving motor, the gearbox comprising:
a casing comprising a base and a cover mounted on the base, the base comprising a bottom plate, and a plurality of peripheral walls extending upward from edges of the bottom plate, the bottom plate defining at least one cavity;
a gear rotatably received in the casing and connected to the driving motor for outputting a driving force generated by the driving motor; and
a controller fixed in the casing, and comprising a printed circuit board and a plurality of electronic components disposed on a side of the printed circuit board facing the bottom plate, the electronic components being received in the at least one cavity to cause the electronic components and the gear to overlap at least a portion of in an axial direction of the gear;
wherein the bottom plate of the casing further defines a receiving space receiving the gear, the receiving space is not in communication with the at least one cavity;
wherein the electronic parking locking actuator further comprises a gear lid fixed in the casing, to seal a gear shaft.

2. The electronic parking lock actuator of claim 1, wherein the receiving space comprises a first round accommodating area and a second round accommodating area coaxially stacked along a direction perpendicular to the bottom plate, the second accommodating area is located below the first accommodating area and has a diameter smaller than a diameter of the first accommodating area, and an opening is defined in a bottom of the second accommodating area, and the opening is aligned with a center of the second accommodating area, the gear includes a disc-like gear body and a gear shaft disposed on one side of the gear body, the gear body is rotatably received in the first accommodating area, and the gear shaft of the gear is rotatably received in the second accommodating area.

3. The electronic parking lock actuator of claim 2, further comprises a magnetic ring disposed on a side of the gear body away from the gear shaft and aligned with a central axis of the gear body.

4. The electronic parking lock actuator of claim 3, wherein the receiving space and the cavity are defined by recessing from an upper surface of the bottom plate, and an upper surface of the bottom plate is perpendicular to the gear shaft.

5. The electronic parking lock actuator of claim 1, wherein a plurality of fixing holes is defined in the gear lid, and a plurality of first positioning posts is disposed on the bottom plate correspondingly fixed in the plurality of fixing holes to fix the gear lid to the bottom plate.

6. The electronic parking lock actuator of claim 5, wherein the first positioning posts are evenly distributed along the circumferential direction around the receiving space.

7. The electronic parking lock actuator of claim 1, wherein a plurality of fixing holes is defined in the printed circuit board, and a plurality of second positioning posts is disposed on the bottom plate correspondingly fixed in the plurality of fixing holes to fix the controller to the bottom plate.

8. The electronic parking lock actuator of claim 1, wherein the at least one cavity comprises more than one cavity not in communication with each other.

* * * * *